United States Patent [19]
Carroll et al.

[11] Patent Number: 5,883,856
[45] Date of Patent: Mar. 16, 1999

[54] POWER SWITCHING METHOD FOR MARINE SEISMIC ACQUISITION SYSTEMS

[75] Inventors: Paul Ellington Carroll, Houston; Karl Joseph Schuler, Sugar Land; Roy Wilson James III, Katy, all of Tex.

[73] Assignee: Input/Output, Inc., Stafford, Tex.

[21] Appl. No.: 962,474

[22] Filed: Oct. 31, 1997

[51] Int. Cl.⁶ .............................. H04B 17/00; G01V 1/00; G01V 1/38

[52] U.S. Cl. ................. 367/13; 367/12; 367/14; 367/15

[58] Field of Search ................. 367/6, 118, 134, 367/904, 15, 13; 307/116, 118

[56] References Cited

U.S. PATENT DOCUMENTS

| | | | |
|---|---|---|---|
| 4,052,694 | 10/1977 | Fredriksson | 340/17 |
| 4,160,228 | 7/1979 | Hix et al. | 340/7 |
| 4,166,270 | 8/1979 | Brastins et al. | 340/5 |
| 4,233,677 | 11/1980 | Brown et al. | 367/13 |

OTHER PUBLICATIONS

Barr et al. "A Dual–Sensor, Bottom–Cable 3–D Survey in the Gulf of Mexico", Society of Exloration Geophysicists. Sep. 1990.

*Primary Examiner*—John Barlow
*Assistant Examiner*—Jonathan R. Spivey
*Attorney, Agent, or Firm*—Tim Headley; Haynes and Boone, L.L.P.

[57] ABSTRACT

An improved bottom cable for a seismic marine data acquisition system 10. The bottom cable 30 includes a cable section 30b having a bus 48. The cable, along with the cable section and bus, are used to electrically connect a master control unit 40 to first and second modules 32b and 32c, respectively. The bus 48 includes first and second switches 48b and 48c, respectively, located near opposite ends of the bus. In this way, if a leak R1 occurs in the bus, the first and second switches can be opened, thereby electrically isolating the bus and stopping the leak.

25 Claims, 2 Drawing Sheets

POWER SWITCHING METHOD FOR MARINE SEISMIC ACQUISITION SYSTEMS

BACKGROUND

This invention relates in general to seismic survey devices and, more specifically, to a system and method for power switching in seismic marine operations.

Marine seismic exploration is an important tool for locating off-shore reserves. Typical explorations are performed by placing many sensors (e.g., hydrophones and/or geophones) on the ocean floor or on a towed streamer. These sensors receive seismic data which is then digitized by electronic modules distributed on the cable and sent to a recording system. The power for these electronic modules is supplied by the recording system and sent down the cable to the modules. A typical marine acquisition system may consist of approximately 1000 sensors spaced along the cable. The total length of a cable with this many sensors can be on the order of tens of miles. This cable is divided into multiple sections which are hooked up between electronic modules. A typical cable section may be 500 to 2500 feet in length.

The cable sections, sensors, and electronic modules are prepared above water and then deployed in the water. The deployment process can take several hours. Once deployed, it is often difficult to keep the cable sections from being damaged. This is due, in part, to the fact that marine explorations are typically deployed in areas populated with numerous obstacles, such as drilling and production platforms and debris therefrom. Also, sharp rocks, marine life, and even the deployment equipment itself can cause cable damage. This cable damage often causes electrical leakage currents to flow into the water. Electrical leakage currents can degrade seismic data quality, and also cause safety problems. For this and other reasons, a damaged cable section that has electrical leakage will generally have to be replaced before exploration can continue.

To replace a damaged cable, the entire system is returned to the surface; the damaged cable section is repaired or replaced; and the entire system is deployed again. Such action is extremely detrimental to the exploration in terms of time, resources, and cost. For example, replacing a single cable section requires several hours of down time. Also, the action requires the use of one or more ships to raise and re-lower the cable. Furthermore, after being repaired or replaced, the cable and accompanying sensors are typically not returned to their exact previous location, and therefore the seismic data becomes corrupted.

Therefore what is needed is a method and apparatus for making the marine exploration system more tolerant to cable damage thus allowing it to remain operational for longer periods of time.

SUMMARY

The foregoing problems are solved and a technical advancement is achieved by a system and method for providing switching power in seismic marine operations. In one embodiment, the system includes a cable section having two independent power buses connected between two electronic modules. The electronic modules provide switches for selectively connecting or disconnecting these buses at either end of the cable section. If leakage occurs in either power bus, the leaking bus is disconnected in the electronic modules at each end of the cable section, thus isolating the bus. The non-leaking bus remains connected in the electronic modules at each end of the cable section. Therefore, the non leaking bus can supply power to the rest of the system, allowing the exploration to continue without the need to replace the cable section.

In another embodiment, the two independent power buses are paired with two additional power buses so that each pair includes positive and negative power. If one bus is detected as leaking and is therefore isolated, the system also isolates the other bus of the pair. In this way, magnetic fields in the remaining operational buses are correctly balanced.

An advantage of the present embodiment is that the system is more tolerant to cable leakage problems so that it can remain operational for longer periods of time.

DETAIL DESCRIPTION OF A PREFERRED EMBODIMENT

Figure 1:
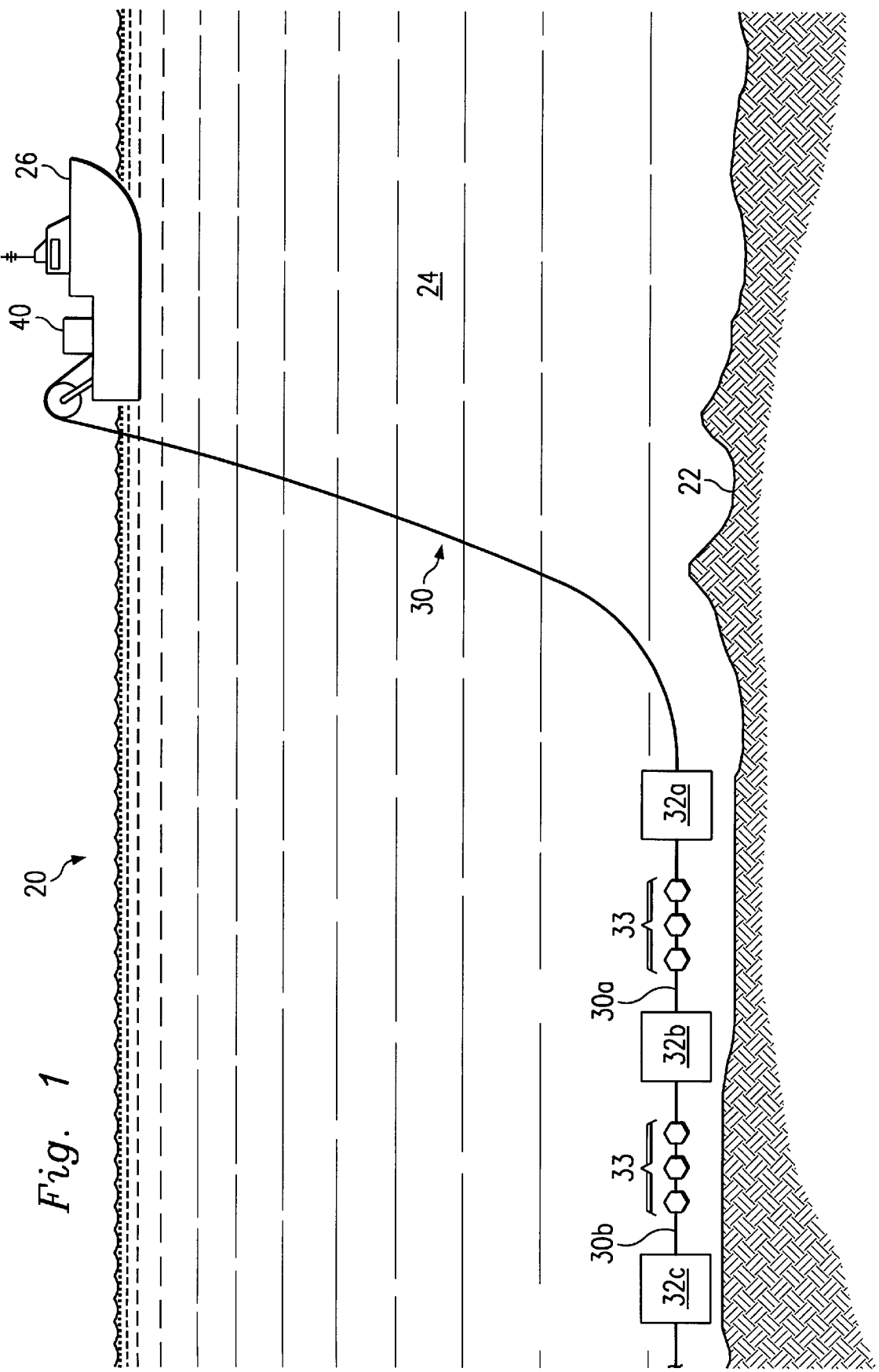
FIG. 1 illustrates a marine seismic exploration system located on a bottom surface of the ocean.

FIG. 1 shows a simplified marine seismic exploration system 20 being deployed on a bottom 22 of an ocean 24 by a ship 26. The system 20 includes a long cable 30 made up of multiple electronic modules 32a, 32b, 32c and multiple cable sections 30a, 30b. Included in each cable section 30a, 30b are a plurality of sensor stations 33. Each station 33 includes one or more sensors, such as hydrophones and/or geophones. The data from the sensors are digitized either at the station 33 or at the electronics module 32a, 32b, 32c and then sent through the cable 30 to a master control unit 40 to be recorded. The location, quantity and types of sensors, electronic modules and cable sections is meant for exemplary purposes only, it being understood that the cable 30 may contain different numbers and types of these units. Also for the sake of reference, electronics modules that are closer to the master control unit 40 are called "upstream," while those further from the master control unit are called "downstream." For example, the electronics module 32a is upstream of the electronics module 32b.

The master control unit 40 supplies the power for the electronics modules 32a, 32b, 32c through power buses in the cable sections 30a, 30b. The master control unit 40 also measures the amount of leakage current from these buses to the ocean 24 so that it can detect if and when a cut or other type of damage occurs in the cable 30, as well as in which cable section the damage occurs, as discussed in greater detail below.

Figure 2:
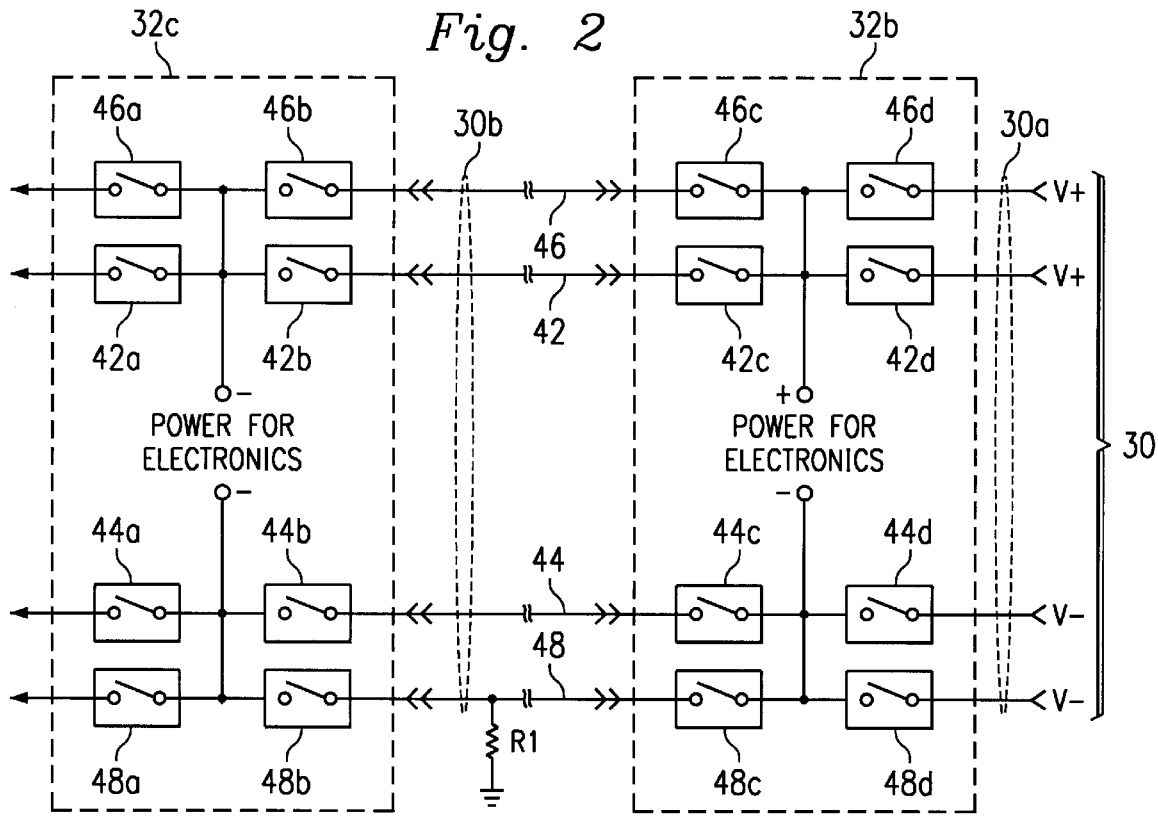
FIG. 2 illustrates a schematic of a cable section and two electronics modules used in the system of FIG. 1.

Referring to FIG. 2, a portion of the cable 30, including cable section 30b and electronics modules 32b, 32c, is shown. The cable section 30b includes two equivalent pairs of power buses: a first pair 42, 44 and a second pair 46, 48. Other portions of the cable 30, such as cable section 30a, may also include two pair of power buses, but for the sake of simplicity, only cable section 30b will be further discussed. It is understood, however, that different cable sections may have different arrangements of power buses, the connections therebetween being easily understood in the art.

Each pair of the power buses provides a positive voltage V+ and a negative voltage V−. Also, all of the buses are electrically isolated except inside the electronic modules, where all the V+ power buses are tied together and all of the V− power buses are tied together. In the cable section 30b, the buses 42, 46 are V+ power buses and the buses 44, 48 are V– power buses. Furthermore, each pair of power buses 42, 44 and 46, 48 is of sufficient gauge to individually supply power to one or more of the downstream electronic modules (e.g., electronic module 32c).

A plurality of switches are placed in-line with each of the buses 42–48. Switches 42a, 42b, 42c, and 42d are placed in power bus 42; switches 44a, 44b, 44c, and 44d are placed in power bus 44; switches 46a, 46b, 46c, and 46d are placed in power bus 46; and switches 48a, 48b, 48c, and 48d are placed in power bus 48. The switches 42a, 42b, 44a, 44b, 46a, 46b, 48a and 48b are located inside, and controlled by, the electronic module 32c while the switches 42c, 42d, 44c, 44d, 46c, 46d, 48c and 48d are located inside, and controlled by, the electronic module 32b. For the sake of this example, the switches are shown as electromechanical switches, but may alternatively be any other type of switch and may be located in various places, as required by other parameters outside the scope of the present embodiment.

Figure 3:
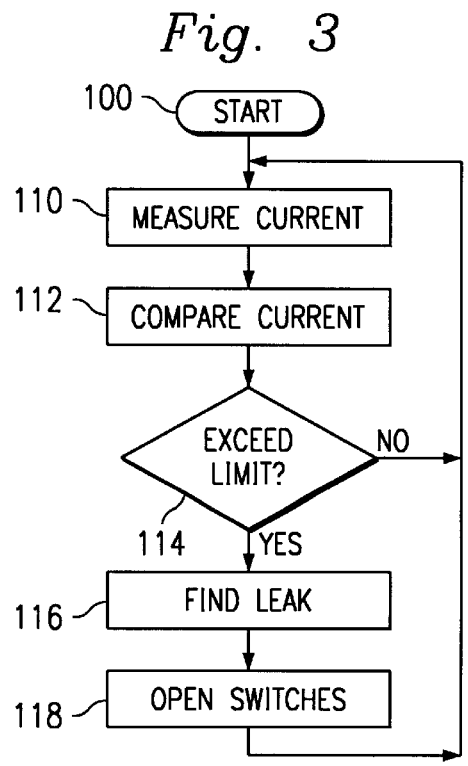
FIG. 3 illustrates a flow chart used to disable a leaky bus of the cable section of FIG. 2.

Referring to FIG. 3, a method 100 is used to control the operation of switches 42a–d, 44a–d, 46a–d, and 48a–d. In the present embodiment, the method 100 is performed in the master control unit 40 located on the ship 26. In alternate embodiments, the method 100 may be performed by each electronic module 32a, 32b, 32c, or certain functions (e.g., current measurement) may be distributed among the different modules. Also, in normal operation with no damaged cable sections, all the switches are closed (i.e., conducting). However, in the presence of a damaged cable section with leakage, some of the switches will be opened to isolate the leaking bus thereby eliminating the leakage. The method 100 determines which switches to open, as described in greater detail below.

At step 110, the master control unit 40 measures a leakage current from the cable 30 to the ocean 24. At step 112, the master control unit 40 compares the current to a predefined maximum leakage current. At step 114, the master control unit 40 determines whether the leakage current exceeds the allowable leakage current. If the measured current does not exceed the maximum leakage current, execution returns to step 110. If the measured leakage current exceeds the maximum leakage current, this indicates that one or more sections of the cable 30 have been damaged, and execution proceeds to step 116.

At step 116, the master control unit 40 determines the location of any leaks in the cable 30. This step can be performed in various ways. For example, the master control unit 40 informs the electronic modules 32b, 32c to open the switches connected to each end of an individual power bus in each cable section one at a time until the excessive leakage current ceases. When the excessive leakage current ceases, the power bus located between the open switches is determined to be the source of the leakage. This may be repeated until all the leaking buses are determined. Once the leaking power bus(es) are found, execution proceeds to step 118 where the switches at both ends of leaking power bus(es) are opened to electrically isolate these bus(es) from the power system. Once the leaking power bus(es) are isolated from the system 20, execution returns to step 110. The normal exploration operation can then proceed without the need to retrieve and replace the damaged cable sections.

For the sake of example, a resistance R1 (FIG. 2) represents a leakage path in cable section 30b from power bus 48 to the ocean 24. At step 110, the master control unit 40 measure the leakage current through the leak R1 and at step 112, compares it to the maximum leakage current. In the present example, the measured leakage current exceeds the maximum leakage current and after step 114, execution proceeds to step 116. The master control unit 40 then checks for leakage in each power bus 42, 44, 46 and 48 by opening the switches corresponding to each bus. When switches 48b and 48c are opened, isolating power bus 48, the leakage current drops below the maximum leakage and the leaking bus is thereby determined. Execution then proceeds to step 118 where the master control unit 40 informs the electronic modules 32b and 32c to open switches 48c and 48b, respectively.

In the present embodiment, switches 46c and 46b are also opened so that the power bus 46 is also isolated, thereby balancing the magnetic fields of all the power buses. In alternative embodiments, this step may not be necessary. Also, it is noted that switches 48b, 48c, 46c and 46b will remain open until the cable section 30b is retrieved and repaired. In this way, the leak R1 will remain isolated until cable section 30b is eventually fixed.

Furthermore, since each of the individual power buses is of sufficient gauge to supply operating power to one or more of the downstream modules, leaks in several different cable sections may be isolated before the cable 30 must be retrieved and repaired, thus making the marine acquisition system 20 employing these improvements a much more productive system.

Although illustrative embodiments have been shown and described, a wide range of modification, change, and substitution is contemplated in the foregoing disclosure and in some instances, some features of the embodiments may be employed without a corresponding use of the other features. For example, additional power bus pairs may be included in each cable section, thereby supplying additional power to the downstream modules and allowing for multiple leaks in the same cable section. Furthermore, the above described method can be implemented solely by the modules, making their operation transparent to the master control unit. Accordingly, it is appropriate that the appended claims be construed broadly and in a manner consistent with the scope of the embodiments disclosed herein.

We claim:

1. A marine seismic exploration system comprising:
    a cable having a cable section, the cable section including first and second power buses such that the second bus is redundant to the first bus;
    a master control unit connected to the cable;
    first and second modules connected to the master control unit through the cable, the cable section being between the two modules; and
    first and second switches spacially connected to the first bus of the cable section;
    wherein, if a leak occurs in the first bus between the first and second switches, the first and second switches are opened, thereby electrically isolating the first bus.

2. The system of claim 1 wherein the first and second switches are located in the first and second modules, respectively.

3. The system of claim 1 wherein the first and second buses are in parallel, and the first bus is electrically isolated from the second bus between the first and second switches.

4. The system of claim 1 wherein the cable section also includes a third and fourth power bus, so that the first and third bus provide a first power bus pair and the second and fourth bus provide a second power bus pair, and wherein the system further comprises third and fourth switches connected to the third bus.

5. The system of claim 4 wherein, if a leak is detected in the first bus of the cable section, the third and fourth switches are also opened, thereby electrically isolating the third bus as well.

6. The system of claim 1 wherein the master control unit includes circuitry for detecting the leak.

7. The system of claim 1 wherein the first module includes circuitry for detecting the leak.

8. The system of claim 1 wherein a determination is made as to whether the leak exists in the first bus by temporarily opening the first and second switch to see if the leak ceases.

9. A marine seismic exploration system comprising:
a cable including two cable sections, the first cable section including a primary power bus and a redundant power bus;
a master control unit connected to the cable;
first and second modules connected to the master control unit through the cable, the first cable section being connected between the first and second modules and the second cable section being connected between the first module and the master control unit; and
first and second switches located in the first and second modules, respectively, and connected to the primary power bus of the first cable section, the first and second switches initially operating in a closed state;
wherein, if a leak is detected in the primary power bus of the first cable section, the first and second switches are opened, thereby electrically isolating the primary power bus.

10. The system of claim 9 wherein the primary and secondary power buses are in parallel and are only electrically connected to each other at the first and second modules and wherein the first and second switches are located within the electrical connections between the primary and secondary power buses.

11. The system of claim 9 wherein the first cable section also includes a third and fourth power bus so that the primary and third power bus provide a first power bus pair and the redundant and fourth power bus provide a second power bus pair, and wherein the system further comprises third and fourth switches located in the first and second modules, respectively, and connected to the third power bus, the third and fourth switches initially operating in a closed state.

12. The system of claim 11 wherein, if a leak is detected in the primary power bus of the cable section, the third and fourth switches are also opened, thereby electrically isolating the third power bus as well.

13. The system of claim 9 wherein the master control unit includes circuitry for detecting the leak.

14. The system of claim 9 wherein the first module includes circuitry for detecting the leak.

15. The system of claim 9 wherein the first and second modules include circuitry for detecting the leak.

16. The system of claim 9 wherein a determination is made as to whether the leak exists in the first power bus by temporarily opening the first and second switch to see if the leak ceases.

17. A method for providing power to and from two modules attached to a cable of a marine seismic exploration system, the method comprising:
providing a primary power bus and a redundant power bus inside a section of the cable between the two modules;
attaching a first and second switch to each power bus, so that the first switches are located near the first module and the second switches are located near the second module;
connecting the primary and redundant power buses together at both the first module and the second module;
providing power to one of the connections of the primary and redundant power buses;
monitoring both power buses for a leakage condition;
if a leakage condition is found, determining which power bus is leaking; and
upon determining which power bus is leaking, opening the first and second switches corresponding to the leaking power bus.

18. The method of claim 17 wherein the step of determining which power bus is leaking is performed by selectively opening each pair of first and second switches and measuring a current flowing through the cable.

19. The method of claim 17 further comprising:
providing a third and fourth power bus inside the section of the cable so that the primary and third power bus provide a first power bus pair and the redundant and fourth power bus provide a second power bus pair;
attaching a first and second switch to each of the third and fourth power buses, so that the first switches are located near the first module and the second switches are located near the second module;
connecting the third and fourth power buses together at both the first module and the second module;
providing power to one of the connections of the third and fourth power buses; and
upon determining which power bus is leaking, opening the first and second switches corresponding to the power bus paired with the leaking power bus.

20. A cable for connecting a first and second module used in marine seismic exploration to a master control unit, the cable comprising:
first and second power buses connected between the first and second modules, the second power bus capable of performing all functions provided by the first power bus;
first and second switches connected to the first power bus near the first and second modules, respectively;
wherein, if a leak occurs in the first power bus, the first and second switches are opened, thereby electrically isolating the first power bus.

21. The cable of claim 20 wherein the first and second power buses are in parallel, and are only electrically connected to each other at the first and second modules.

22. The cable of claim 20 further comprising:
a third and fourth power bus so that the first and third power bus provide a first power bus pair and the second and fourth power bus provide a second power bus pair, and
third and fourth switches connected to the third power bus near the first and second modules, respectively.

23. The cable of claim 22 wherein, if a leak occurs in the first power bus, the third and fourth switches are also opened, thereby electrically isolating the third power bus as well.

24. The cable of claim 22 wherein operation of the switches is controlled by the master control unit.

25. The cable of claim 22 wherein operation of the switches is controlled by the first module.

* * * * *